United States Patent [19]
Strenzke et al.

[11] Patent Number: 4,884,402
[45] Date of Patent: Dec. 5, 1989

[54] CONTROL AND REGULATING DEVICE FOR A HYDROSTATIC DRIVE ASSEMBLY AND METHOD OF OPERATING SAME

[75] Inventors: Hilmar Strenzke, Aschaffenburg; Norbert Fehn, Elsenfeld, both of Fed. Rep. of Germany

[73] Assignee: Linde Aktiengesellschaft, Wiesbaden, Fed. Rep. of Germany

[21] Appl. No.: 190,720

[22] Filed: May 6, 1988

[30] Foreign Application Priority Data

May 14, 1987 [DE] Fed. Rep. of Germany ....... 3716200

[51] Int. Cl.[4] .............................................. F16D 31/02
[52] U.S. Cl. ........................................ 60/426; 60/433; 60/445; 60/465; 91/364; 91/459; 91/517; 91/532
[58] Field of Search ................. 60/465, 445, 433, 422, 60/426, 395; 91/517, 532, 459, 364

[56] References Cited

U.S. PATENT DOCUMENTS

| | | | |
|---|---|---|---|
| 3,908,862 | 9/1975 | Chandra et al. | 91/364 X |
| 4,202,247 | 5/1980 | Hunkar et al. | 91/364 |
| 4,375,747 | 3/1983 | Friedrich | 60/433 |
| 4,644,748 | 2/1987 | Goss et al. | 60/395 |
| 4,738,104 | 4/1988 | Hahmann et al. | 60/433 X |
| 4,759,183 | 7/1988 | Kreth et al. | 91/459 X |
| 4,790,233 | 12/1988 | Backe et al. | 91/459 |

FOREIGN PATENT DOCUMENTS

| | | |
|---|---|---|
| 0104613 | 4/1984 | European Pat. Off. . |
| 3347000 | 12/1983 | Fed. Rep. of Germany . |

*Primary Examiner*—Edward K. Look
*Attorney, Agent, or Firm*—Thomas R. Shaffer

[57] ABSTRACT

A hydrostatic drive assembly with an adjustable pump driven by a primary power source, which acts on several consumers of hydrostatic energy, is disclosed which has a control and regulating device with nominal speed value pickups and adjustable restrictors for each consumer. In order to obtain a control and regulating device at a low production cost, one that operates with a low power loss, it is proposed that the nominal speed value pickup send an electric signal to an electronic control device, that each consumer be provided with an actual speed value pickup, which the control device, and the restrictors assigned to each of the consumers in their connection lines are designed as electromagnetic throttle valves controlled by the electronic control device.

7 Claims, 1 Drawing Sheet

CONTROL AND REGULATING DEVICE FOR A HYDROSTATIC DRIVE ASSEMBLY AND METHOD OF OPERATING SAME

BACKGROUND OF THE INVENTION

1. Field of the Invention

The invention relates to a control and regulating device for a hydrostatic drive assembly of the type including adjustable pump driven by a primary power source and by which several consumers of hydrostatic energy are acted upon, and having a nominal speed value pickup provided for each consumer and an adjustable restrictor assigned to each consumer. The invention also relates to a process for operating such a control and regulating device.

2. Description of the Art

A familiar control and regulating device of the said type has a multiway valve that throttles in the intermediate positions as the speed set-point adjuster for each consumer, in which case the multiway valves assigned to the individual consumers are preferably switched together in the form of a block valve, where the adjusting element of the pump is controlled in the sense of a regulation of the stream required through the pressure drop at the restrictor of this multiway valve. In order to achieve a situation where each consumer moves with the desired speed independently of the load if several consumers are simultaneously controlled, where different pressures will always occur in the operating state in the individual consumers, a hydraulically controlled load-equalizing parallel-connection restrictor, which is acted upon by a control pressure whose level is determined by the pressure of the consumer operating with the highest pressure, is assigned to each consumer (European Patent 0,053,323). Very good results and functions can be achieved with such drive functions. However, the disadvantages are that the main working stream must necessarily flow through a restrictor in which a portion of the energy is annihilated and also that the hydraulic control pressure lines required necessitate a great expense.

SUMMARY OF THE INVENTION

The invention proposes to offer a control and regulating device and a process for operating same, with which it is possible to work with a lower energy loss, which can be produced with a lower manufacturing cost and also facilitates additional advantageous refinements.

This problem is solved through a control and regulating device having an adjustable pump driven by a primary power source and by which several consumers of hydrostatic energy are acted upon, and having a nominal speed value pickup provided for each consumer and an adjustable restrictor assigned to each consumer. The nominal speed value pickup is adapted to transmit an electric nominal signal and an actual speed value pickup assigned to each consumer is adapted to transmit an electric actual speed signal. An electronic control device is electrically connected to the nominal speed value pickup and to the actual speed value pickup to receive said nominal and actual signals, and the restrictor assigned to a consumer is an electromagnetic throttle valve controlled by the electronic control device.

The use of an electronic control to which electric signals are fed is essential here. Various refinement possibilities result for the speed set-point adjuster. It is also possible to measure the hydraulic stream flowing to the individual consumer with conventional hydraulic flowmeters, e.g., rotating pulse-imparting impellers, as used in dispensing pumps, as it is also possible to measure the position of the piston rod and to calculate the moving speed of the piston from the change in position of the piston rod. Transmitters that deliver a signal dependent on the position of the piston in the cylinder are also known (DE-OS 33 24 584; DE-OS 18 07 174). The mode of operation is as follows: if an individual consumer, e.g., a cylinder of a dredger, is acted upon, a certain movement speed is prescribed by the speed set-point adjuster. In the electronic control the actual speed value to be adjusted is compared with the prescribed nominal speed value and the adjusting element of the pump is regulated through the electronic control so that the delivery stream of the pump is precisely so great that the desired speed is regulated at the consumer, i.e., the actual speed value matches the nominal speed value. The throttle valve is fully open here, such that no power losses occur in it. If a second consumer is now switched in, for example, a second working cylinder is switched in alongside a first cylinder, the force on the piston rod and the pressure required in the working cylinder will not be equal by chance in the two cylinders. The result is that the stream delivered by the pump first flows into the cylinder in which a piston displacement is possible with a lower pressure; consequently, a high actual speed value results in this cylinder. This high actual speed value signal is then evaluated in the electric control mechanism and, as a function of this signal, directs the electromagnetic throttle valve assigned to this consumer into a throttling position, with the result that a lesser stream flows to this working cylinder and consequently a greater stream flows to the other working cylinder, such that the actual speed value desired is set in the two cylinders. Due to the throttling in the controlled throttle valve of the consumer operating with the lower pressure, a pressure is built up in front of this throttle valve that matches the pressure with which the consumer operating with the higher pressure must work. The electromagnetic throttle valve assigned to the consumer operating with the higher pressure does however remain fully open.

Through the choice of the cylinder diameter and the lengths of the effort arm on which the piston rods engage, it can be structurally predetermined in which cylinder under which specific operating conditions the higher pressure and in which the lower pressure will be required, so that it will be possible to achieve the lowest throttling losses where a large stream flows most frequently. On the whole, the electronic control mechanism acts with the magnetic throttle valves as a load-distributing device.

Numerous other refinements result from this basic arrangement. For example, it is possible if several pumps, which are assigned to one hydraulic circuit, are driven jointly by one internal combustion engine to determine whether power flows back from the consumer to the pump in one of the circuits such that this power can be fed through a common gear reduction drive unit directly to the other pump, so that the engine can be regulated to a correspondingly lower power output. Control connections can also be achieved, through which a pressure head that has a braking action is effected by throttling in the drain line of the consumer when an excessively high speed is reached in the braking state. The direction of movement of the consumer and the pressure in the line and thus the power absorbed can be determined for each consumer. If the sum of the actual speed values is less than the sum of the nominal speed values, the pump is first set to a greater delivery volume per revolution and then the engine is adjusted to a higher r.p.m. If two pumps are present and the sum of the actual speed values remains smaller than the sum of the nominal speed values in the circuits of the one pump, even though the pump has reached its maximum delivery level and the primary power source has reached the maximum rate r.p.m., the delivery line of the second pump can be automatically connected to the delivery line of the first pump through the control mechanism provided the second pump is not in turn load-equalized. The first pump then remains fully swung out and the stroke volume per revolution of the second pump is regulated as a function of the magnitude of the sum of nominal values or of the results of the nominal/actual value comparison. It would also be conceivable to maintain the regulation of the first pump and only regulate the first pump as in normal operation; it can be more difficult here to achieve a continuous transition during switching in. It would be conceivable, but more difficult to regulate both pumps simultaneously.

In basic principle, a closed regulation system from the speed nominal set-point adjuster to the consumer is present in the control and regulating device for a drive system according to the invention, especially for a drive system for a dredger. That is, the movement of the final consumer, controlled for example by the dredger operator at the control lever that serves as the nominal speed set-point adjuster, is fed back from the actual speed value pickup of the consumer and the adjustment values of the intermediate elements between the primary power source and the consumer, namely, the operating cylinder of the pump, throttle valve, and directional valve, required for adjusting the pump to the delivery stream required, is controlled by the electronic control unit. This is valid not only if only one consumer is regulated, but also in the regulation of several consumers simultaneously or when an additional consumer is switched in. In any case, the sum signal of all the consumer speeds, both the sum of the nominal speeds and the sum of the actual speeds, is regulated so that the quantitative stream requirement or demand and thus the delivery stream of the pump are adapted precisely to the need of the consumer, where the throttling losses in the restrictors are minimized. The consumer throttle valves are structurally designed so that they can throttle both the inlet lines to the individual consumers and their return lines, or a restrictor is installed both in the inlet line to the consumer and also in the return line, in which case they can be regulated jointly or individually.

During operation with only one consumer, a movement of this final consumer is regulated by the dredger operator through actuation of the control lever. In this case, the pertinent directional valve is regulated by the electronic control unit. Then the delivery stream of the adjustable pump is regulated with respect to how it corresponds to the nominal speed value prescribed at the control lever and the pertinent final control elements, namely the throttle valve and directional valve, are fully open. The actual speed valve is simultaneously determined at the consumer and considered with the nominal value of the control lever in the electronic control unit. If there is a difference between the actual and nominal values, the pump stroke volume per revolution is readjusted until the difference between the nominal and actual speed values is equal to zero. Because the other adjusting elements, namely the throttle valve and directional valve, are fully closed, no additional throttling losses occur in them.

If an additional control lever is actuated by the dredger operator in order to act upon two consumers simultaneously, a directional valve and consumer throttle valve are also first opened for the consumers additionally switched in. At the same time, the pump is regulated by the sum signal of the quantitative streams required ba the first and second consumers. Because the individual consumers have different pressure requirements in the normal case, the rate of movement of the consumer with the lower pressure requirement will be greater than its nominal speed. As a result, the quantity entering this consumer operating with a lower pressure must be throttled by means of the consumer throttle valve until the actual speed value matches the nominal value at this consumer. At the same time, the consumer with the higher pressure requirement will have an excessively low actual speed value. This consumer is now defined by signals with respect to the control unit as the guide consumer i.e., its consumer throttle valve remains fully open and its speed regulation deviation is used for readjusting the pump. As a result, this consumer is operated without power losses, while the quantitative requirement of the second consumer is regulated through the consumer throttle valve.

If a third consumer is now switched in, the same effect is first obtained with respect to this third consumer as with respect to the second consumer. However, the case can arise where the actual speed values of the two consumers are both smaller than the nominal values. In this case, the consumer throttle valves of these two consumers will then be fully adjusted up and the pump will again be set at the greater delivery volume per revolution. After a time, one of these two consumers will have an excessively high actual speed value so that the throttle valve on this consumer is regulated and the stream that flows to this consumer is throttled. Then the nominal speed value pickup of the consumer whose speed then proves to be still too low automatically becomes the guide signal sender, which controls the swing-out position of the pump, because it has the highest pressure according to the above definition. The throttle valve assigned to this consumer is thus fully opened.

If an equalized operating state has been achieved in such a drive system, in which all the actual consumer values match the assigned nominal values and it so happens then that due to some interference an excessively high speed arises at one or more consumers, the pump will be set back to a smaller stroke volume per revolution until one of the consumers exhibits an excessively low speed. The actual speed value pickup of this consumer then becomes the guide magnitude signal sender i.e., it takes over the function of fine adjustment of the pump, while the other consumers are controlled through the consumer throttle valves.

One of several possible extreme positions can arise here. If, for example, one of the consumers runs into a stop in its end position, the following two conditions arise in it: the actual speed value ie equal to zero, while the nominal speed value is not equal to zero. Due to this excessively low actual speed value, this consumer automatically becomes the consumer that takes over the guidance. If the speed remains zero, the pump is adjusted to a calculated reduced delivery stream that covers the leakage oil and its prescribed reserve for this consumer, apart from the sum signal of the other consumers switched in. The amount required above the nominal value is thus not unnecessarily released through the over-pressure valve with throttling because this drainage under throttling would mean an energy loss.

If a pressure sensor is also used at the consumer, the previously calculated adjustment value of the pump can be further reduced through the development of a pressure regulating zone so that the leakage oil stream requirement is precisely covered by the pump.

The arrangement and the process according to the invention can also be used in the case of hydraulic consumers with a linear movement (cylinder-piston assemblies) as well as in consumers of hydraulic energy with a rotating shaft, where in the case of several consumers an arbitrary number of them can be linear consumers and the remainder consumers with rotating shafts.

A consumer can also be a traction motor, e.g., of a dredger, in which a braking state can occur during operation, in which the hydraulic motor absorbs mechanical energy on the shaft, which is converted into hydraulic energy in the hydraulic motor. The problem arises in going downhill that the hydraulic motor in the braking state delivers into the drain line to the tank, in which case an underpressure can arise in the line between the pump and the hydraulic motor, resulting in the danger of cavitation and thus the risk of destruction of the hydraulic units because the stream delivered by the pump is no longer sufficient. If the r.p.m. of the hydraulic motor exceeds the prescribed nominal value, i.e., the vehicle goes over into slipping operation, this fact is detected by the actual r.p.m. value pickup. The pump is then adjusted to a certain value of the stroke volume per revolution in order to deliver the oil stream absorbed by the hydraulic motor. If a regulatable throttling possibility, e.g., an adjustable pressure-limiting valve, is installed in the drain line of the hydraulic motor according to another step of the invention, it will be controlled by the electronic control unit and thus increases the pressure in the drain line of the hydraulic motor, to the extent that the actual speed value, which is detected as the r.p.m. of the hydraulic motor shaft, matches the prescribed nominal value. This control and regulation is taken over here by the same speed regulator that acted on the throttle valve in the inlet line during the acceleration phase.

According to another refinement, a pressure switch is also built into the inlet line of the hydraulic motor, which sends a signal in the case of a very rapid pressure drop in the feed line of the hydraulic motor if it drops below a certain prescribed value. This pressure switch then immediately also switches in the pressure limiting value in the return line of the hydraulic motor and makes the pump swing out and/or the throttle valve open, even if only a slight speed increase or none at all is reported by the actual r.p.m. valve pickup. The danger of cavitation should thus be avoided with a rapid transition from travel drive operation to braking operation. Pressure switches can also be used in the individual lines in order to determine, together with a signal for the direction of consumer travel, whether the latter is operating in the braking state. Maximum load regulation is known in itself, i.e., in a drive system of a primary power source and a hydrostatic drive unit, regulations in which if the speed of the primary power source drops due to an excessively high torque given off at the power takeoff shaft of the primary power source the pump of the hydrostatic drive unit is set to a smaller stroke volume per revolution and thus to a lesser torque at the pump drive shaft. They are also known in the arrangement as electronic regulation. Such a maximum load regulation is superposed on the above system of consumer regulation according to the invention. If the drive engine is overloaded in the case of a high power requirement the consumer, it is forced below its nominal r.p.m. value prescribed by the setting of the power regulating element. This suppression is detected by a comparison between nominal value and actual value of the primary power source r.p.m. If the actual r.p.m. drops below a value prescribed by the set-point adjuster, the individual final consumers are regulated back in their power requirement until the primary power source can furnish the sum of powers absorbed. The value as to how far the speed of the drive engine can be suppressed, i.e., the boundary r.p.m., is prescribed, that is, the maximum load regulator controls both the pump and the throttle valves.

If an electronic maximum load regulation is present and it engages when the speed of the drive engine is suppressed, or if the pump sum signal is too large due to many consumers switched in, the nominal values delivered by the individual set-point adjuster-control lever are throttled back in a freely established degree until a flawless behavior of the dredger is obtained, independently of the momentary position of the set-point adjuster-control levers. Such a control intervention can be designed so that all the actual speed values are throttled back in the same ratio, i.e., that with a controlled superposed movement the resulting movement remains the same, but merely slowed down, that is, the coordination of the movements is retained. In another implementation it is also possible to distribute the speed reductions in a different manner, such that a specific consumer is regulated back more strongly than another. An electronic pressure or pressure limitation regulation can also be achieved by the incorporation of pressure sensors in the individual consumer lines and a reckoning of the measurement values with the individual positions of the consumer can be achieved so that critical situations as can occur, for example, in the turning of the upper part of a dredger with an excessively high load are avoided because the load ratios are then determined by the pressure sensors and a reduction in the turning speed, for example, can take place through the pressure sensors so that critical situations or overloads cannot occur.

The invention and its mechanism of action are elucidated in the following on the basis of an implementation example represented by a circuit diagram.

DETAILED DESCRIPTION OF THE PREFERRED EMBODIMENT

Figure 1:
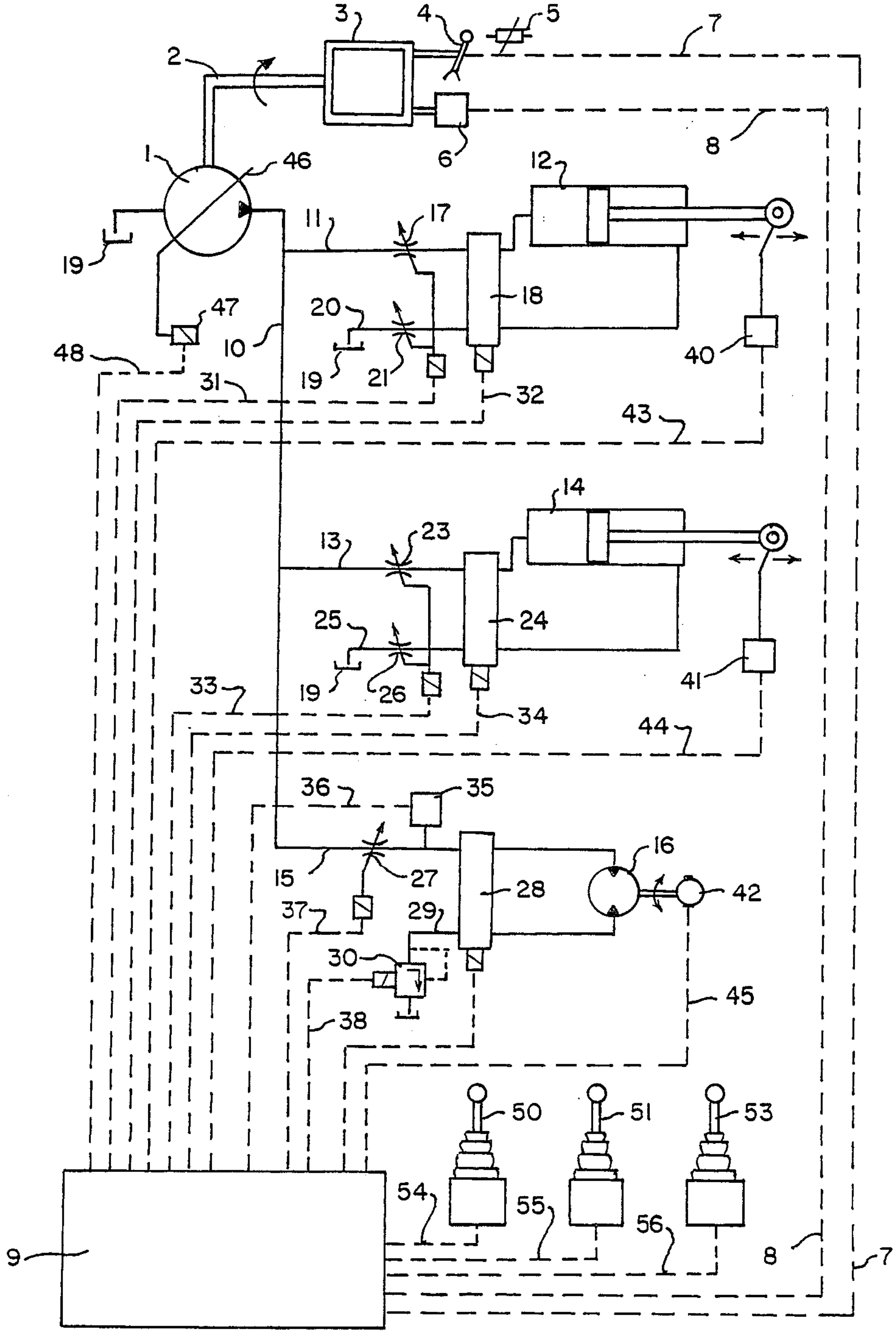
FIG. 1 is a circuit diagram of a control and regulating device according to the present invention.

The adjustable pump 1 is driven through the shaft 2 by the primary power source 3 whose power regulating element can be adjusted by means of an adjusting lever 4, where this adjusting lever 4 is connected with a nominal speed value potentiometer 5. The shaft of the primary power source 3 is also connected with actual speed value pickup 6. A line 7 goes out from the nominal speed value pickup 5 and a line 8 goes out from the actual speed value pickup 6 and the two lines 7 and 8 are connected with an electronic control unit 9.

A delivery line 10 is connected to the pump 1 and a branch line 11 leads from it to a consumer 12. Another branch line 13 that leads to a consumer 14 is connected to the pump delivery line 10 and a third branch line 15 that leads to a hydraulic motor 16 is connected to the pump delivery line 10.

An electromagnetically adjustable throttle valve 17 is located in the branch line 11 and an electrically controllable direction-switching valve 18 is located between the valve 17 and the consumer 12. A drain line 20 leading to a tank 19 and in which a second electromagnetic throttle valve 21 is located is connected to the valve 18. The electromagnetic throttle valves 17, 18 and 21 are proportional valves.

In the same manner, an electromagnetic throttle valve 23 is located in the branch line 13 and a direction-switching valve 24 is located between the valve 23 and the consumer 14, where a second electromagnetic throttle valve 26 is located in the drain line 25.

An electromagnetic throttle valve 27 is located in the branch line 15, as well as a direction-switching valve 28. The drain line 29 departing from the direction-switching valve 28 leads to a pressure-limiting valve 30, which can be regulated electromagnetically.

The electromagnetic throttle valves 17 and 21 are controlled through an electric control line 31 and the direction-switching valve 18 is controlled through an electric control line 32. The electromagnetic throttle valves 23 and 26 are also controlled through an electric control line 33 and the direction-switching valve 24 is controlled through an electric control line 34.

A pressure switch 35, from which an electric signal line 36 departs, is connected to the branch line 15 between the electromagnetic restrictor 27 and the direction-switching valve 28. The electromagnetic restrictor 27 is controlled through an electric signal line 37 and the pressure-limiting valve 30 is controlled through an electric control line 38, in which case all the electric control lines 31, 32, 33, 34, 36, 37 and 38 are connected to the electronic control device 9.

The consumer 12 is provided with an actual speed value pickup 40 and the consumer 14 is provided with an actual speed value pickup 41 and the hydraulic motor 16 is provided with an r.p.m. pickup or tachometer 42, where an electric signal line 43 departs from the actual speed value pickup 40, an electric signal line 44 departs from the actual speed value pickup 41 and an electric signal line 45 departs from the tachometer 42, in which case the signal lines 43, 44 and 45 are also connected to the electronic control device 9.

The final control element 46 of the pump 1 is connected with an electric control device 47, which is connected to an electric control line 48, which is also connected to the electronic control device 9.

The control lever 50 serves as the nominal speed value sender for the consumer 12 and is connected to the electronic control device 9 through an electric control line 54.

The control lever 51 serves as the nominal speed value sender for the consumer 14 and is connected to the electronic control device 9 through an electric control line 55.

The control lever 53 serves as the nominal value sender for the hydraulic motor 16 and is connected to the electronic control device 9 through an electric control line 56.

For example, if the control lever nominal speed value sender 50 is arbitrarily controlled, the direction-switching valve 18 is brought into a certain open position. At the same time, the magnetic throttle valves 17 and 21 are fully open and the pump is swung out so that the actual speed value reported by the actual speed value sender 40 matches the nominal value prescribed at the control lever 50. If the nominal speed value lever 51 is now also actuated, the direction-switching valve 24 is also moved into one of its open end positions and monitors the speed at the actual speed value sender 41. If the force at the piston rod of the consumer 14, relative to the piston surface, is less than the force at the piston rod of the consumer 12, the piston will advance more rapidly in the cylinder 14 than corresponds to the nominal value prescribed at the lever 51, while on the other hand the piston in the cylinder 12 has a lower actual speed than prescribed at the control lever 50. In this case, a signal is sent by the electronic control system 9 through the line 33, through which the two electromagnetic throttle valves 23 and 26 are moved into a throttling position so that a pressure is built up in front of it in the branch line 13, which corresponds to the pressure that is required in the cylinder 12, where at the same time through this pressure buildup the stream flowing through the restrictor 23 becomes so small that the actual speed value matches the nominal value.

If the hydraulic motor 16 is controlled through the control lever 53, essentially the same regulating action results. However, if the hydraulic motor 16 goes into braking operation and as a result an underpressure develops in the branch line 15, the pressure switch 35 responds if the pressure drops below a prescribed boundary value. On the basis of the signal of the pressure switch 35, a regulation intervention occurs, which increases the delivery stream of the pump 1 so that cavitation damage due to underpressure in the feed line to the hydraulic motor 16 cannot occur in it. At the same time, if the r.p.m. of the hydraulic motor 16 in braking operation, i.e., the r.p.m. signal measured at the r.p.m. signal pickup 42, is greater than the nominal value signal, which is prescribed by the lever 53, the pressure-limiting valve 30 is set to a higher pressure so that a pressure is built up in the drain line 29. If two consumers 12 and 14 or 12 and 16 or 14 and 16 are simultaneously controlled or if all three consumers 12, 14 and 16 are simultaneously controlled and the sum of the nominal speed values is greater than the sum of the actual speed values, a signal is first fed to the adjusting element 47 of the pump 1, through which the pump is set to a larger stroke volume per revolution.

If a matching of the actual speed values to the nominal speed values still cannot yet be achieved in this manner, the actuating lever 4 is automatically shifted by an additional device (not shown) so that the primary power source 3 is set to a higher r.p.m.

While various features and advantages of the present invention have been described above, it is to be distinctly understood that the invention is not limited thereto but may be otherwise practiced within the scope of the following claims.

We claim:

1. An improved hydrostatic assembly including a control and regulating device therefore of the type having an adjustable pump (1) including an adjustable element (47) and driven by a primary energy source (3), a plurality consumers (12, 14, 16) each operably connected to said adjustable pump by a consumer connection branch line (11, 13, 15) for movement in two opposite directions of movement, a plurality of direction-reversing valves (18, 24, 28) one connected to each consumer by one of said consumer connecting branch lines, a plurality of electromagnetic throttle valves (17, 23, 27) one provided in each of the consumer connection branch lines, an electronic control (9) electrically connected to said electromagnetic throttle valves, a plurality of speed setpoint adjusters (50, 51, 53) one electrically connected to the electronic control for each consumer, and a plurality of actual speed value pickups (40, 41, 42) one connected to the electronic control are provided for each consumer, wherein the improvement comprising:

(a) at least one of the consumers (16) having a rotating shaft and being operable in a braking state; and (b) an electric pressure switch (35) for transmitting a pressure signal, said electric pressure switch electrically connected to the electronic control (9) and connected to the consumer connection line (15) for said at least one consumer (16) between the throttle valve (27) assigned to said at least one consumer (16) and said at least one consumer (16).

2. A hydrostatic drive assembly according to claim 1 wherein said actual speed value pickup associated with said at least one consumer (16) is an r.p.m. pickup (42).

3. A hydrostatic drive assembly according to claim 2 further comprising a pressure--limiting valve (30) located in a drain line of said at least one consumer (16).

4. A method of using a hydrostatic drive assembly according to claim 3 comprising the step of adjusting the electromagnetic throttle valve (17, 23, 27) of at least one of the consumers (12, 14, 16) whose speed set-point value is too high into a throttling position until the difference between the speed set-point and the speed actual-value at said at least one consumer is equal to zero, in which the electromagnetic throttle value (17, 23, 27) of the at least one consumer (12, 14, 16) whose speed actual-value falls below the assigned speed set-point by a small value at the most remains fully open and the speed actual-value signal of said at least one consumer (12, 14, 16) is utilized as a guide signal for setting the adjusting element (47) of the pump (1) of the electronic control (9), whereby during braking, the pressure-limiting valve (30) located in the drain line of the consumer (16) is set into a throttling position.

5. A method according to claim 4, further comprising feeding a signal to the electronic control (9) through a pressure sensor (35) located in a consumer connection branch line when a prescribed limiting value of pressure in said branch line is exceeded, and processing this signal in the electronic control (9), together with signals on the variation in the speed set-point value and the actual speed value, to provide at least one of an acceleration limiting control and a speed limiting control.

6. A method according to claim 4 for operating a control device with a suppression boundary load regulation, further comprising reducing all the speed set points in a predetermined ratio when the primary power source r.p.m. is suppressed below a predetermined limiting value.

7. A method according to one of claims 4, 5 or 6, further comprising reducing all the set-points for the speed regulation in a predetermined ratio whenever the pump is required to deliver more than the maximum delivery amount.

* * * * *

UNITED STATES PATENT AND TRADEMARK OFFICE

CERTIFICATE OF CORRECTION

PATENT NO. : 4,884,402

DATED : December 5, 1989

INVENTOR(S) : Hilmar Strenzke and Norbert Fehn

It is certified that error appears in the above-identified patent and that said Letters Patent is hereby corrected as shown below:

Column 10, line 4, after "which" insert --case--.

Signed and Sealed this

Twenty-sixth Day of March, 1991

Attest:

HARRY F. MANBECK, JR.

*Attesting Officer* *Commissioner of Patents and Trademarks*